US012514780B2

(12) United States Patent
Lyles

(10) Patent No.: US 12,514,780 B2
(45) Date of Patent: Jan. 6, 2026

(54) ELECTRIC SHAVER AND MASSAGER

(71) Applicant: John Lyles, Cherry Hill, NJ (US)

(72) Inventor: John Lyles, Cherry Hill, NJ (US)

( * ) Notice: Subject to any disclaimer, the term of this patent is extended or adjusted under 35 U.S.C. 154(b) by 533 days.

(21) Appl. No.: 18/178,635

(22) Filed: Mar. 6, 2023

(65) Prior Publication Data

US 2024/0252394 A1 Aug. 1, 2024

Related U.S. Application Data

(63) Continuation-in-part of application No. 29/870,544, filed on Jan. 30, 2023, now Pat. No. Des. 1,080,998.

(51) Int. Cl.
*A61H 23/02* (2006.01)
*B26B 19/04* (2006.01)
*B26B 19/38* (2006.01)

(52) U.S. Cl.
CPC ......... *A61H 23/0254* (2013.01); *B26B 19/04* (2013.01); *B26B 19/386* (2013.01); *B26B 19/3873* (2013.01); *B26B 19/3886* (2013.01); *A61H 2201/0107* (2013.01); *A61H 2201/0119* (2013.01); *A61H 2201/0153* (2013.01);
(Continued)

(58) Field of Classification Search
CPC ........ B26B 19/00–48; A61H 23/00–06; A61H 2201/0107; A61H 2201/0119; A61H 2201/0153; A61H 2201/0157; A61H 2201/1418; A61H 2201/1669;
(Continued)

(56) References Cited

U.S. PATENT DOCUMENTS 4,275,862 A * 6/1981 Takagi .................. A45D 27/29 248/205.3
2013/0199348 A1* 8/2013 Aberizk ............. A61N 1/36034 30/34.2

(Continued)

FOREIGN PATENT DOCUMENTS

CN 103317533 A * 9/2013
DE 202015000664 U1 3/2015
WO 2016033640 A1 9/2014

OTHER PUBLICATIONS

Translation of CN 103317533. Accessed from PE2E-Search on Oct. 17, 2025. (Year: 2105).*

(Continued)

*Primary Examiner* — Paige Kathleen Bugg

(57) ABSTRACT

An electric shaving massager is an apparatus that is used to facilitate the grooming of body hair as well as to enable the physical stimulation of different body areas. The apparatus includes a modular shaver, a modular massager, a razor head, and a power interface. The modular shaver is an electric shaver that can accommodate different attachments that facilitate the shaving or trimming of different body hair. The modular massager is an electric massager designed to provide physical stimulation to different body areas. The razor head corresponds to one of several razor heads that can be selectively attached to the modular shaver to groom the desired body hair. The power interface enables the selective coupling of the modular massager to the modular shaver. The power interface also enables the power transmission from the modular massager to the modular shaver when the modular massager is coupled to the modular shaver.

11 Claims, 21 Drawing Sheets

(52) U.S. Cl.
CPC ................ *A61H 2201/0157* (2013.01); *A61H 2201/1418* (2013.01); *A61H 2201/1669* (2013.01); *A61H 2201/169* (2013.01); *A61H 2201/503* (2013.01)

(58) Field of Classification Search
CPC ........ A61H 2201/169; A61H 2201/503; A61H 19/00–50
USPC ........................................................... 601/72
See application file for complete search history.

(56) References Cited

U.S. PATENT DOCUMENTS

| | | | | |
|---|---|---|---|---|
| 2014/0288364 | A1 | 9/2014 | St. Bernard | |
| 2015/0164738 | A1* | 6/2015 | Caropelo | A61H 19/30 601/46 |
| 2019/0307983 | A1* | 10/2019 | Goldman | A61B 5/165 |
| 2021/0030620 | A1* | 2/2021 | Wilt | A61H 19/44 |
| 2021/0386618 | A1* | 12/2021 | Gutmann | A61H 37/005 |
| 2022/0355497 | A1* | 11/2022 | Schneider | B26B 19/3853 |
| 2023/0346634 | A1* | 11/2023 | Wu | A61H 23/004 |
| 2024/0066731 | A1* | 2/2024 | Piesker | B26B 19/3813 |

OTHER PUBLICATIONS

Freya., Vee Starter Kit, retrieved from Internet retrieved on Jan. 30, 2023, <URL: https://www.hifreya.com/products/starter-kit>.

Everett, Lee, Tinge® Offers Discreet Luxury Vibrator Disguised as a Razor—Woman Inventor Motivated to Design a Vibrator that Lives “Right Under Their Noses!”, retrieved from Internet retrieved on Jan. 30, 2023, <URL: https://www.prweb.com/releases/2009/05/prweb2397974.htm>.

Doctor Love’s, Trifecta Rechargeable Vibrator W/ 3 Interchangeable Heads Black, retrieved from Internet retrieved on Jan. 30, 2023, <URL: https://www.amazon.ca/TRIFECTA-RECHARGEABLE-VIBRATOR-INTERCHANGEABLE-HEADS/dp/B085CND1QV>.

* cited by examiner

ELECTRIC SHAVER AND MASSAGER

The current application is a continuation-in-part (CIP) application of the U.S. design application Ser. No. 29/870,544 filed on Jan. 30, 2023.

FIELD OF THE INVENTION

The present invention relates generally to personal care devices and multipurpose appliances. More specifically, the present invention provides an electric personal care device that includes a body grooming feature with a body massaging feature.

BACKGROUND OF THE INVENTION

Nowadays, body trimmers and shavers come with several features that enable the user to perform various grooming activities. By utilizing a multipurpose body trimmer/shaver, users can save time and money by not having to obtain different grooming devices. Several of these devices are now designed to accommodate several attachments that enable the grooming of different body areas. For example, the attachments can be razor heads designed for the grooming of facial hair or razor heads designed for the grooming of the lower body. Further, some body trimmers and shavers include additional features that enable personal care aside from body hair grooming. For example, some body trimmers and shavers include massaging features that can be used to physically stimulate various body areas. However, many of these devices are limited to mechanical shavers due to the power limitation of the device. For example, if the massaging feature is electric, the body trimmer or shaver may not be electric. This further limits the functionality of the device since electric body trimmers and shavers can utilize several attachments. Therefore, a device that can incorporate an electric body trimmer/shaver as well as an electric body massager is necessary to provide greater functionality to the user.

An objective of the present invention is to provide an electric shaving massager that can be used to groom different body hair or to physically stimulate different body areas. The present invention incorporates an electric body trimmer/shaver that enables the grooming of body hair in an efficient and safe manner. The present invention also incorporates an electric massager that enables the user to physically stimulate different body areas. Another objective of the present invention is to provide an electric shaving massager that accommodates different razor heads that enables the grooming of body hair in different body areas. Another objective of the present invention is to provide an electric shaving massager with a modular design that enables the separate use of the electric massager from the electric shaver for the convenience and the safety to the user. Additional features and benefits of the present invention are further discussed in the sections below.

SUMMARY OF THE INVENTION

The present invention is an electric shaving massager that incorporates an electric body trimmer/shaver and an electric massager in a practical modular structure. The present invention is designed as a modular structure that includes a modular shaver and a modular massager. The modular shaver and the modular massager are designed as matching halves that can be selectively coupled to form a single ergonomic structure. To do so, the present invention includes a power interface that enables the selective coupling of the modular massager to the modular shaver as well as to enable the power transmission from the modular massager to the modular shaver when the modular massager is coupled to the modular shaver.

The modular shaver is preferably an electric shaver that accommodates different razor heads that can be used to shave or trim different body hair. The modular shaver is coupled to the modular massager to form an ergonomic structure that can be safely handled by the user to groom the target body hair. Further, the modular massager is preferably an electric massager that can be used separate from the modular shaver for safety and to improve the comfort of the user while physically stimulating different body areas. The modular massager is designed with various stimulating features that enhances the physical stimulation of the target body area.

DETAIL DESCRIPTIONS OF THE INVENTION

All illustrations of the drawings are for the purpose of describing selected versions of the present invention and are not intended to limit the scope of the present invention.

Figure 1:
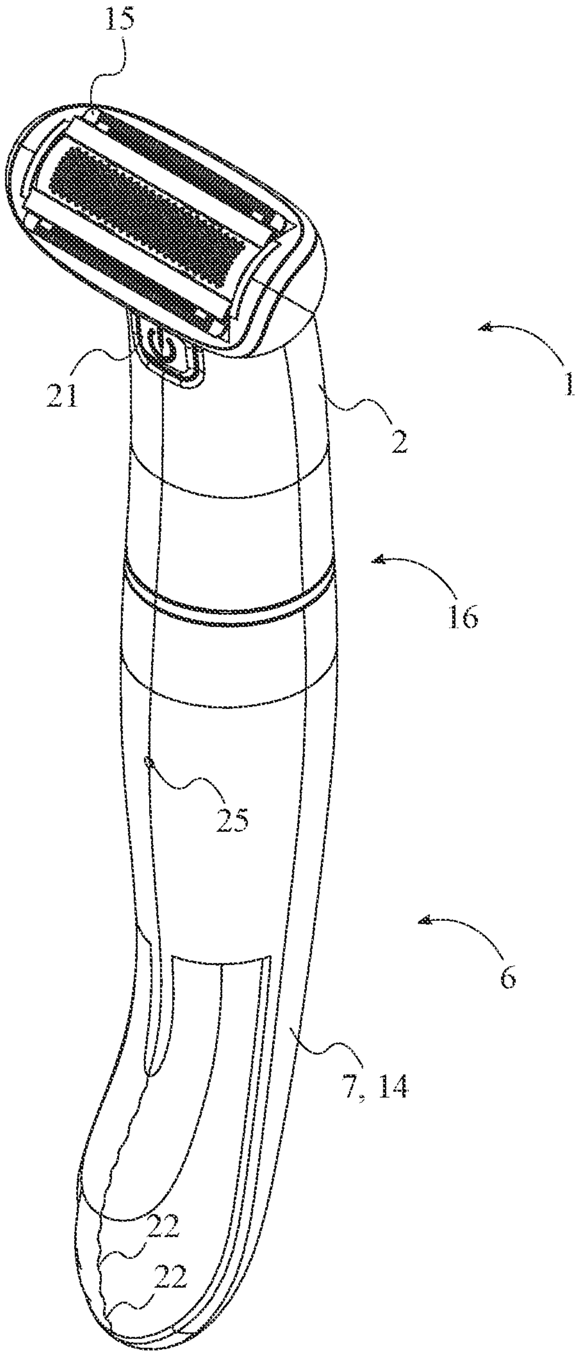
FIG. 1 is a top front perspective view of the present invention.
Figure 2:
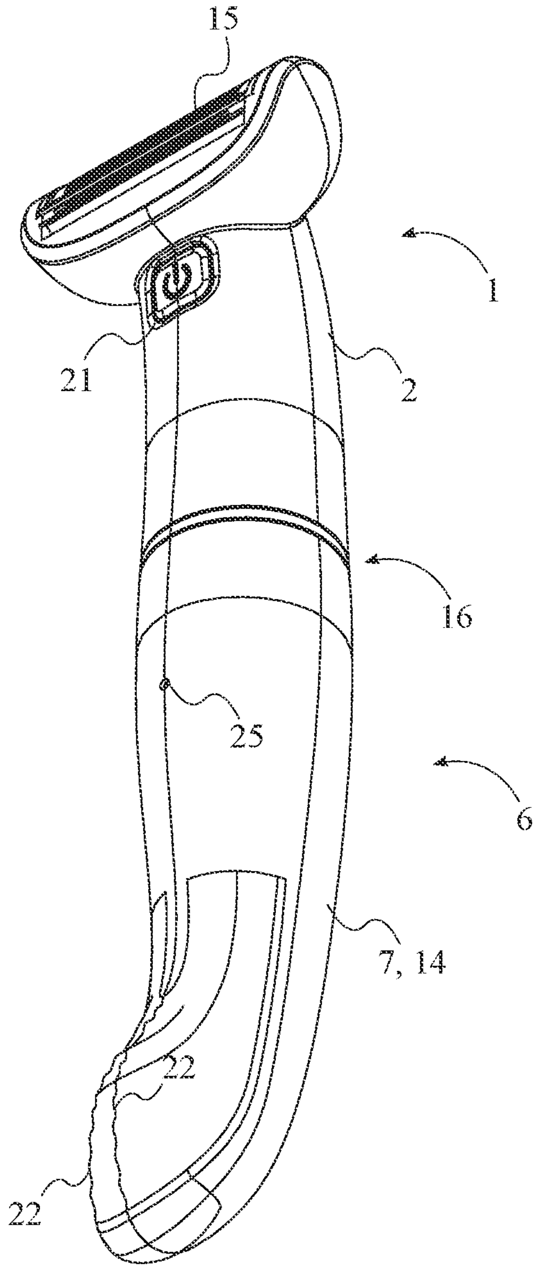
FIG. 2 is a bottom front perspective view of the present invention.
Figure 3:
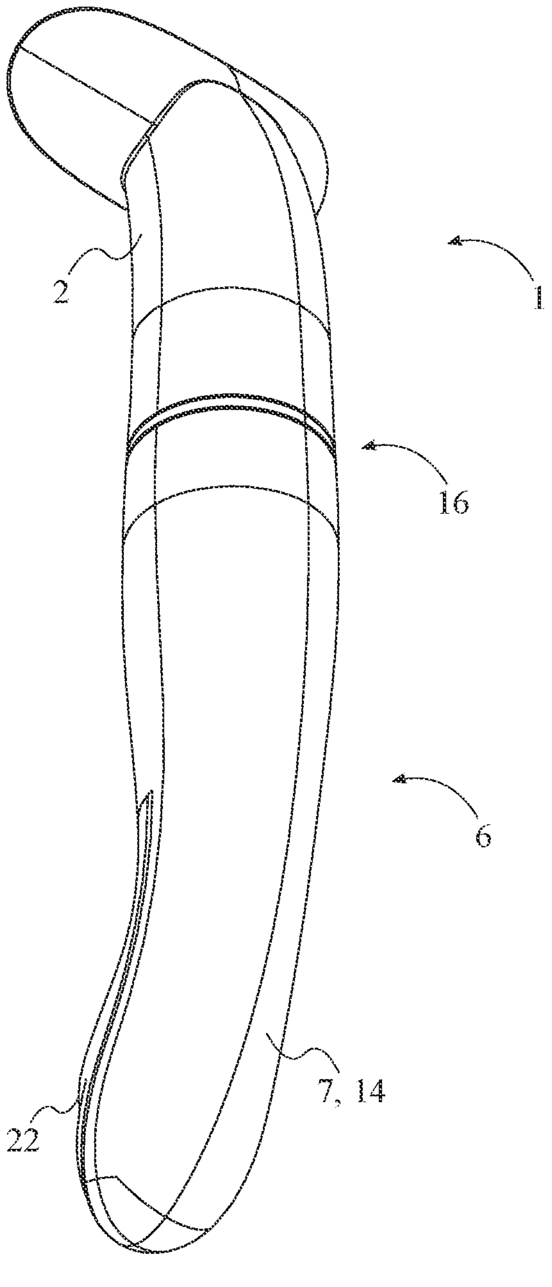
FIG. 3 is a bottom rear perspective view of the present invention.
Figure 4:
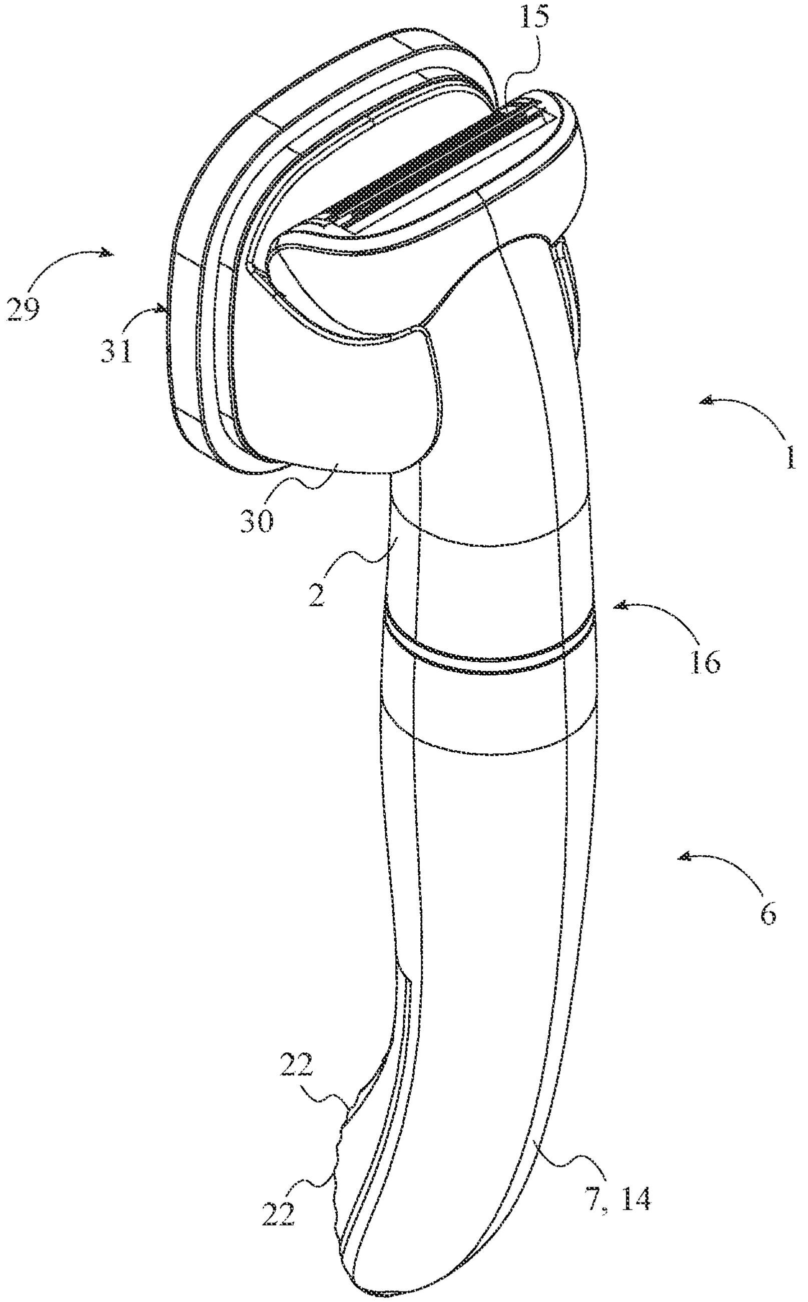
FIG. 4 is a top rear perspective view of the present invention, wherein the present invention is shown mounted onto a device holder.
Figure 5:
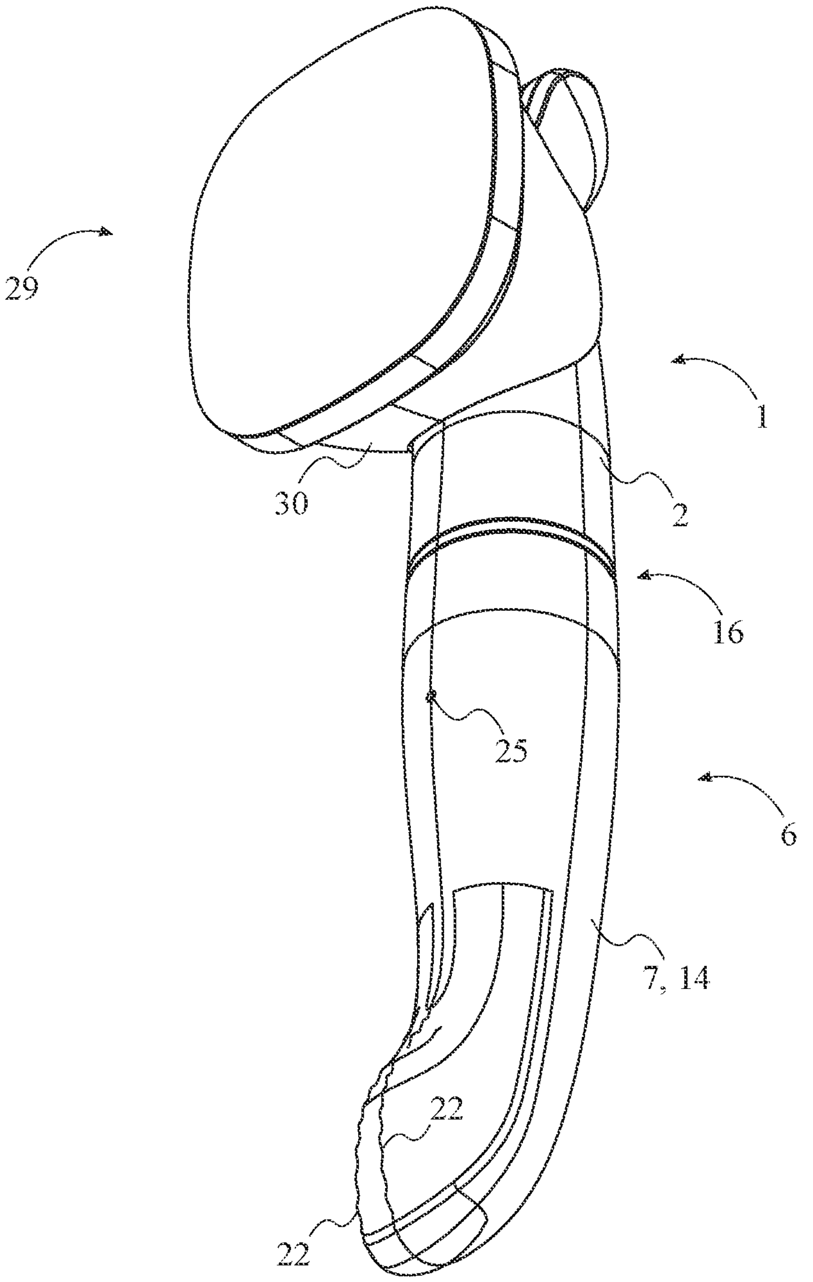
FIG. 5 is a bottom front perspective view of the present invention, wherein the present invention is shown mounted onto the device holder.
Figure 6:
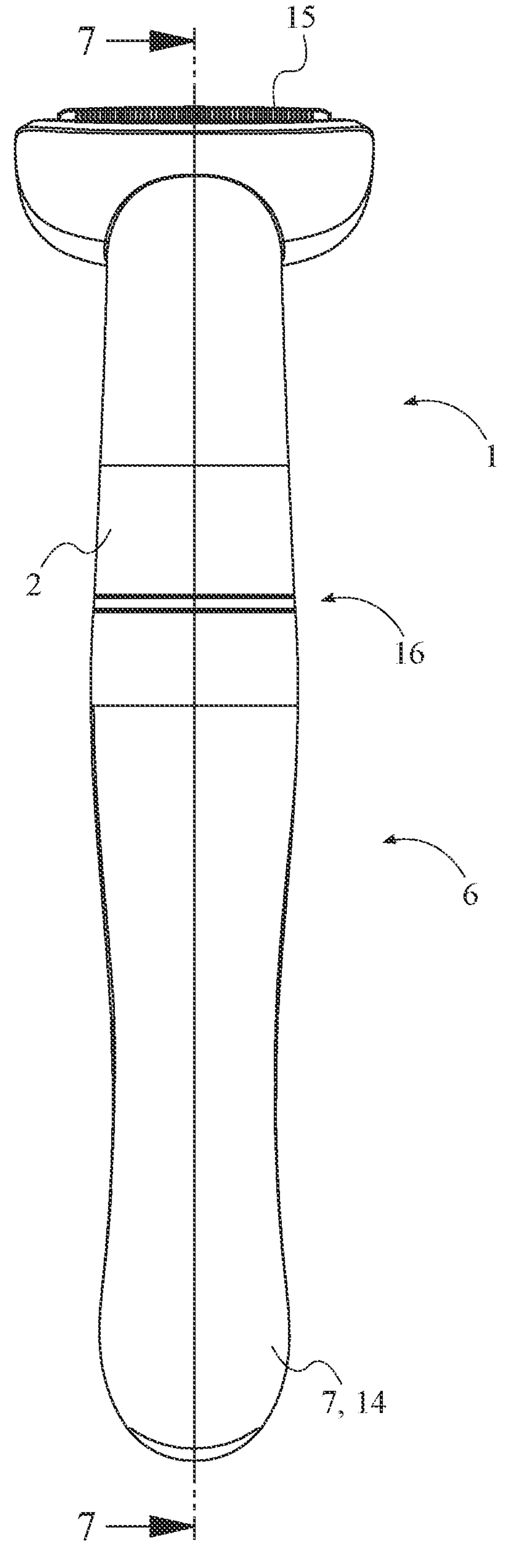
FIG. 6 is a rear view of the present invention.
Figure 7:
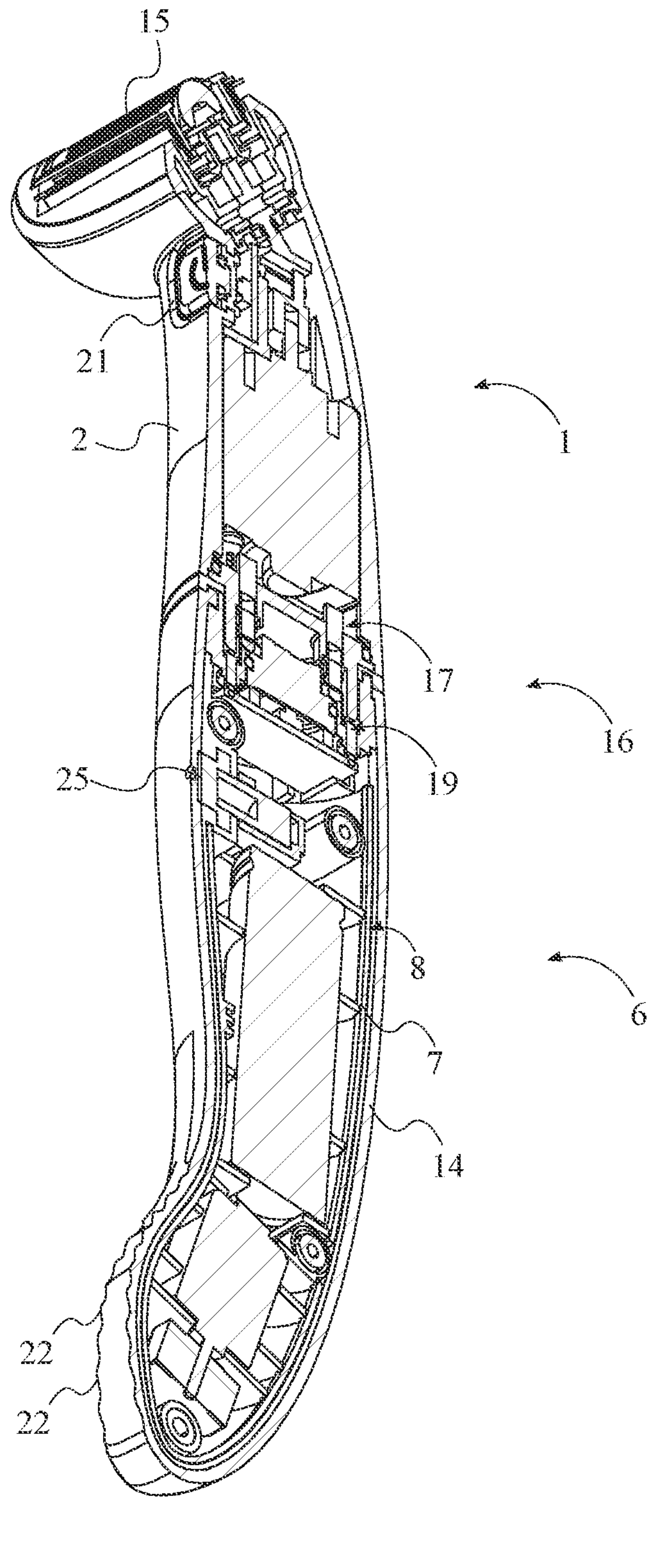
FIG. 7 is a perspective cross-sectional view of the present invention taken along line 7-7 in FIG. 6.

The present invention is an electric shaving massager that is used to facilitate the grooming of body hair as well as to enable the physical stimulation of different body areas. As can be seen in FIGS. 1 through 7, the present invention comprises a modular shaver 1, a modular massager 6, at least one razor head 15, and a power interface 16. The modular shaver 1 is an electric shaver that can accommodate different attachments that facilitate the shaving or trimming of different body hair. The modular massager 6 is an electric massager designed to provide physical stimulation to different body areas in a safe and efficient manner. The at least one razor head 15 corresponds to one of several razor heads that can be selectively attached to the modular shaver 1 to groom the desired body hair. The power interface 16 enables the selective coupling of the modular massager 6 to the modular shaver 1. The power interface 16 also enables the power transmission from the modular massager 6 to the modular shaver 1 when the modular massager 6 is coupled to the modular shaver 1.

The general configuration of the aforementioned components enables users to efficiently and safely groom various body hair or to physically stimulate the desired body areas. As previously discussed, the modular shaver 1 is an electric mechanism that enables the use of different razor heads to groom different body hair efficiently and safely. As can be seen in FIGS. 1 through 7, the modular shaver 1 comprises a shaver hollow body 2 and an oscillating mechanism 3. The shaver hollow body 2 is designed to be safely held by the user while grooming body hair. The shaver hollow body 2 is also designed to protect the electric and/or electronic components necessary for the operation of the modular shaver 1. The oscillating mechanism 3 enables the operation of the at least one razor head 15 when the at least one razor head 15 is attached to the modular shaver 1. Further, the modular massager 6 comprises a massager hollow body 7, a vibration mechanism 9, and a portable power source 13. The massager hollow body 7, like the shaver hollow body 2, is designed to be safely held by the user. The massager hollow body 7 is uniquely shaped to match the shape of the shaver hollow body 2 so that the user can comfortably grab onto both the modular shaver 1 and the modular massager 6 when the modular massager 6 is coupled to the modular shaver 1. However, the massager hollow body 7 is also designed to be comfortably held alone when uncoupled from the shaver hollow body 2. The massager hollow body 7 is also designed to protect the electric and/or electronic components necessary for the operation of the modular massager 6. The vibration mechanism 9 enables the physical stimulation of the target body area when using the modular massager 6. The portable power source 13 provides the power necessary for the operation of the modular massager 6 or the modular shaver 1. Furthermore, the power interface 16 comprises a first interface piece 17 and a second interface piece 19. The first interface piece 17 and the second interface piece 19 correspond to two separate matching pieces that can be selectively coupled to connect the modular massager 6 to the modular shaver 1. The first interface piece 17 and the second interface piece 19 also enable the power transmission from the portable power source 13 to the oscillating mechanism 3 when coupled together.

Figure 21:
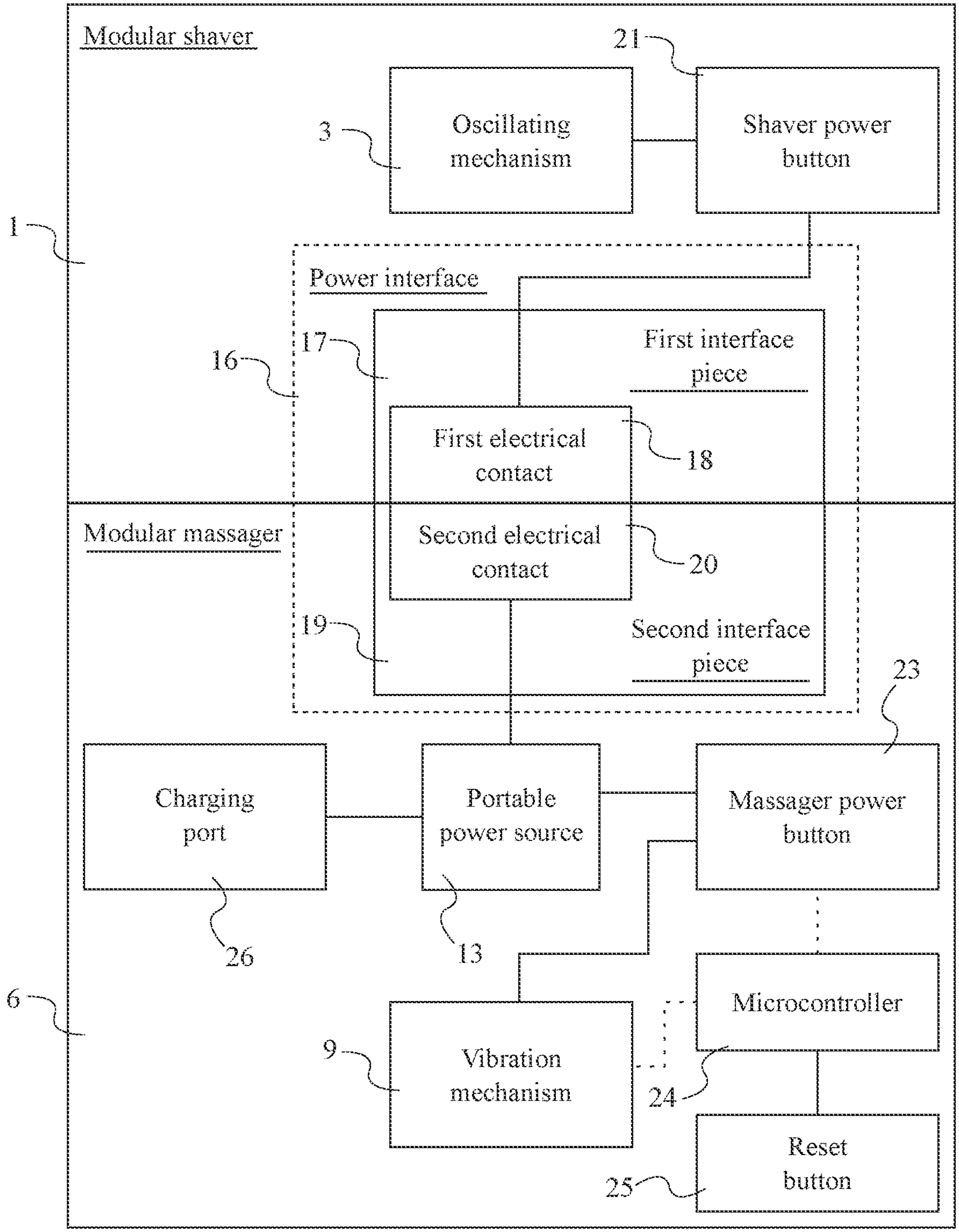
FIG. 21 is a schematic view of the electronic and electrical connections of the present invention, wherein the electronic connections are shown in dashed lines, and wherein the electrical connections are shown in solid lines.

The present invention is preferably assembled as follows. As can be seen in FIGS. 1 through 7 and 21, the at least one razor head 15 is terminally mounted to the shaver hollow body 2 so that the at least one razor head 15 can be used to groom the target body hair. For example, the at least one razor head 15 can be a trimmer head, a single-blade shaving head, a multiple-blade shaving head, etc. Each razor head is designed with an attachment mechanism that is compatible with the structure of the shaver hollow body 2. The first interface piece 17 is terminally mounted to the shaver hollow body 2, opposite to the at least one razor head 15. This way, the first interface piece 17 does not obstruct the operation of the at least one razor head 15 nor the at least one razor head 15 obstructs the coupling of the first interface piece 17 with the second interface piece 19. Further, the oscillating mechanism 3 is mounted within the shaver hollow body 2 to protect the electrical and/or electronic components of the oscillating mechanism 3. The oscillating mechanism 3 is also operatively coupled to the at least one razor head 15. The oscillating mechanism 3 is used to drive a reciprocating shaving motion of the at least one razor head 15. In other words, the oscillating mechanism 3 drives the one or more blades of the at least one razor head 15 in a reciprocating motion to cut the desired amount of body hair. Further, the oscillating mechanism 3 is electrically connected to the first interface piece 17 to transmit power from the first interface piece 17 to the oscillating mechanism 3 when the modular shaver 1 is coupled to the modular massager 6. The second interface piece 19 is terminally mounted to the massager hollow body 7 to secure the second interface piece 19 to the massager hollow body 7. In addition, the portable power source 13 is mounted within the massager hollow body 7, adjacent to the second interface piece 19, to protect the portable power source 13. Similarly, the vibration mechanism 9 is mounted within the massager hollow body 7, offset from the second interface piece 19, to protect the vibration mechanism 9. Further, the second interface piece 19 and the vibration mechanism 9 are electrically connected to the portable power source 13 to transmit the power from the portable power source 13 to the second interface piece 19 and the vibration mechanism 9. Furthermore, to connect the modular shaver 1 to the modular massager 6, the first interface piece 17 and the second interface piece 19 are engaged to each other. This way, the first interface piece 17 can be electrically connected to the second interface piece 19 to allow the power transmission from the portable power source 13 to the oscillating mechanism 3.

Figure 8:
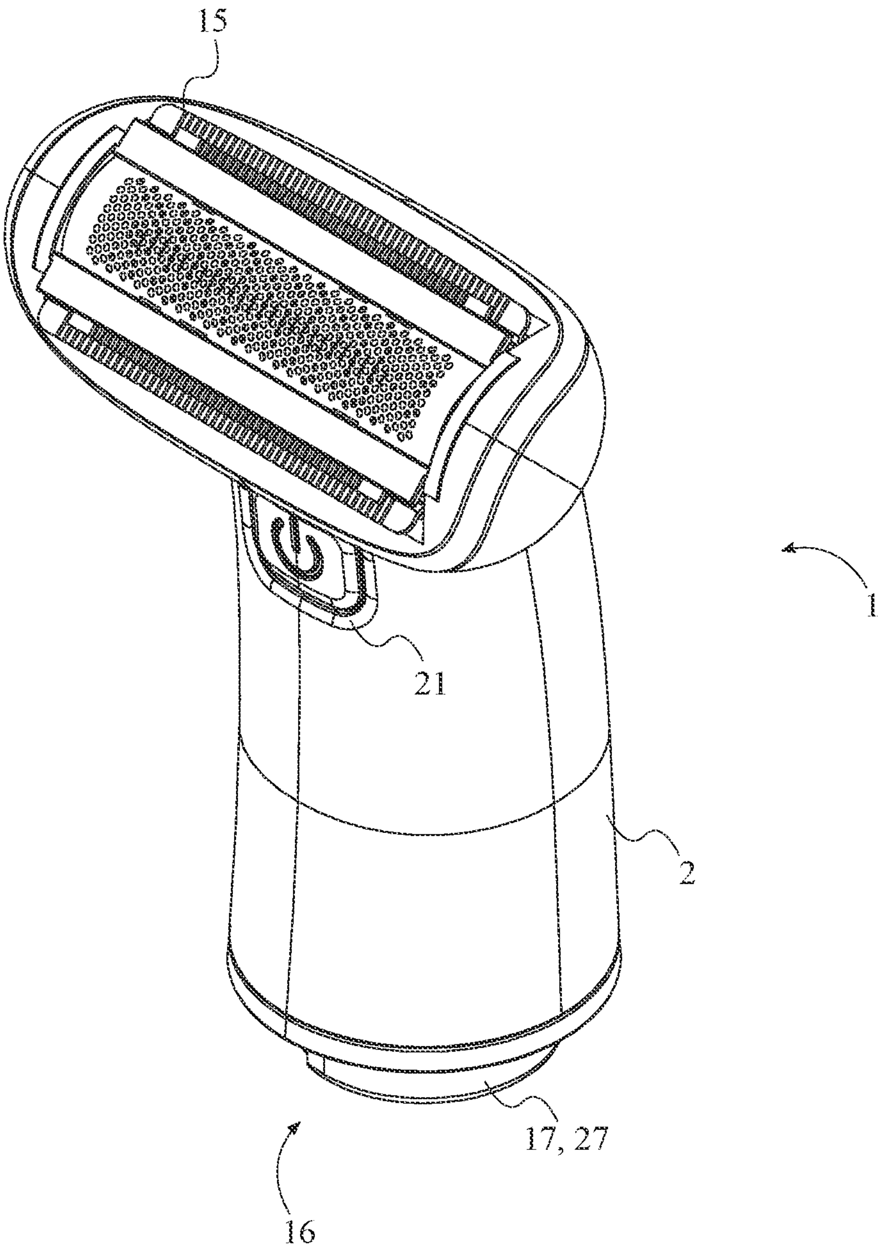
FIG. 8 is a top front perspective view of a modular shaver of the present invention.
Figure 9:
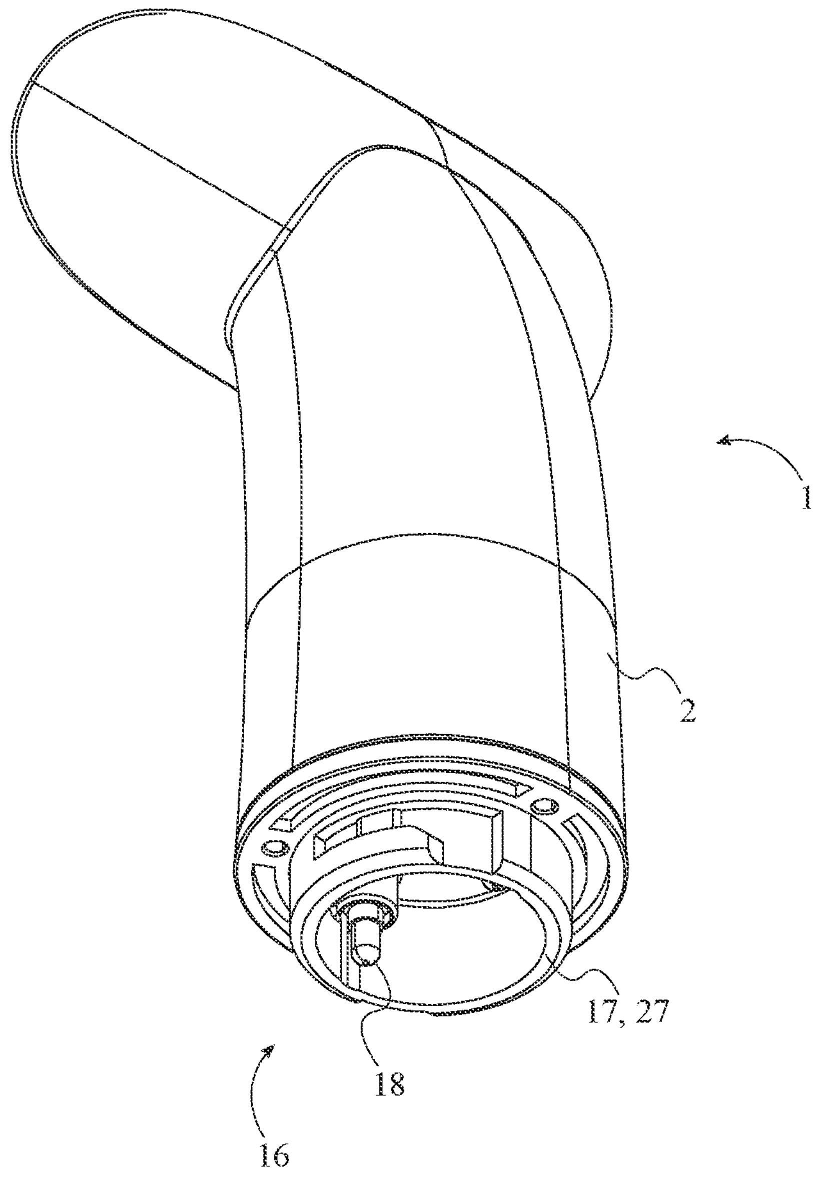
FIG. 9 is a bottom rear perspective view of the modular shaver of the present invention.
Figure 10:
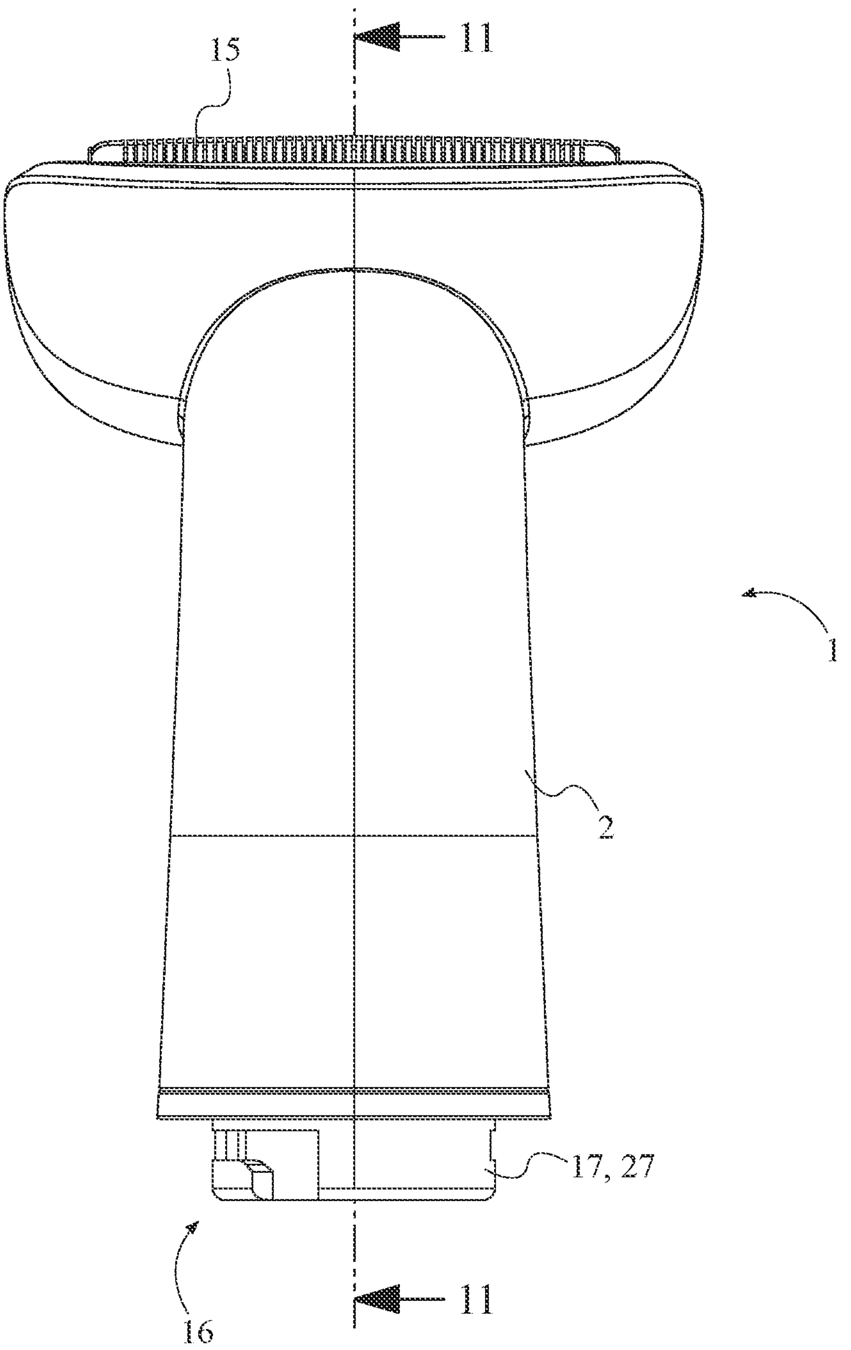
FIG. 10 is a rear view of the modular shaver of the present invention.
Figure 11:
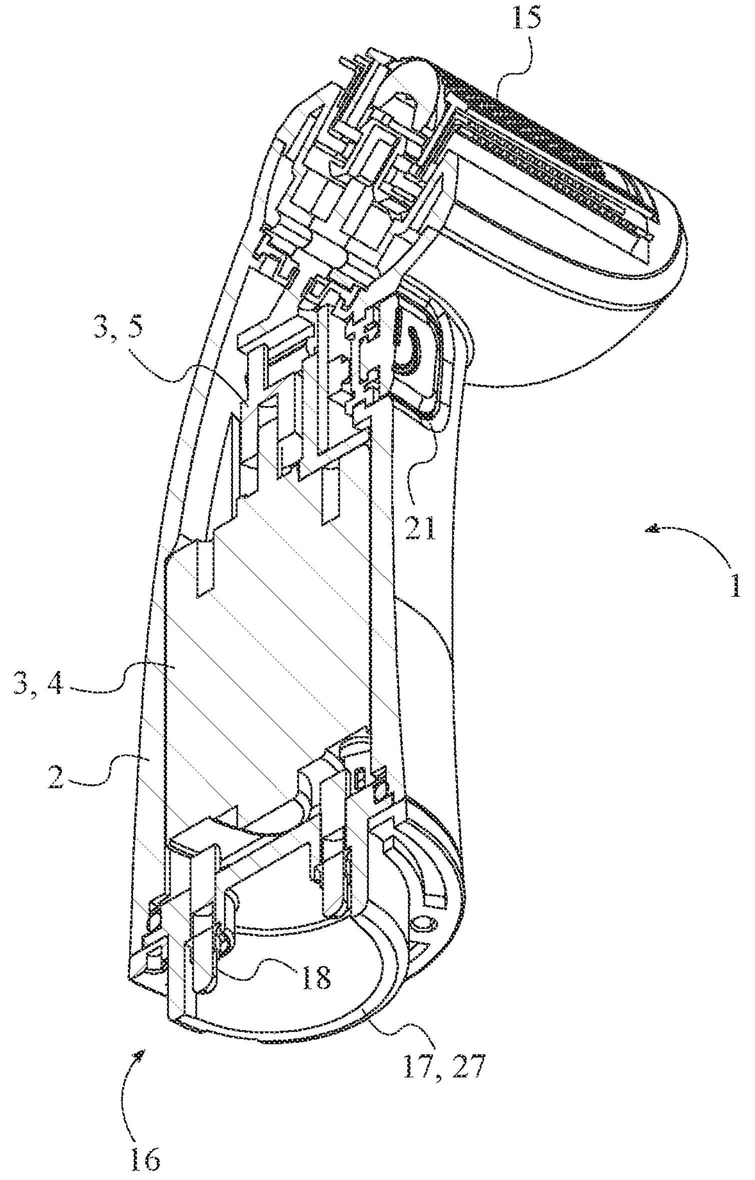
FIG. 11 is a perspective cross-sectional view of the modular shaver of the present invention taken along line 11-11 in FIG. 10.
Figure 12:
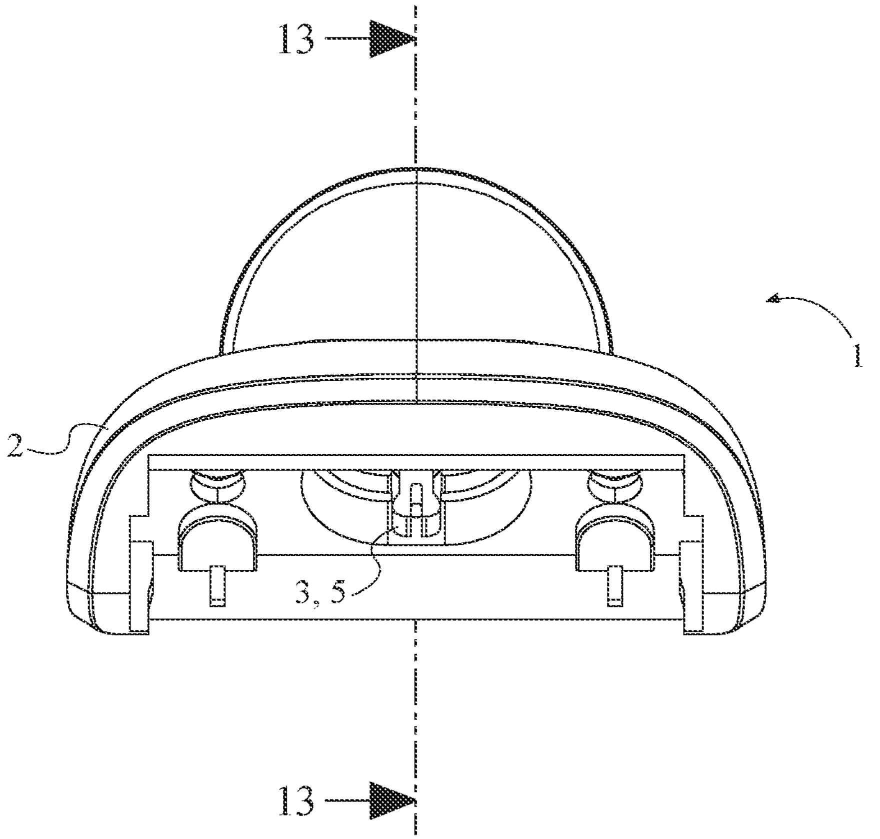
FIG. 12 is a top view of the modular shaver of the present invention, wherein the modular shaver is shown without a razor head.
Figure 13:
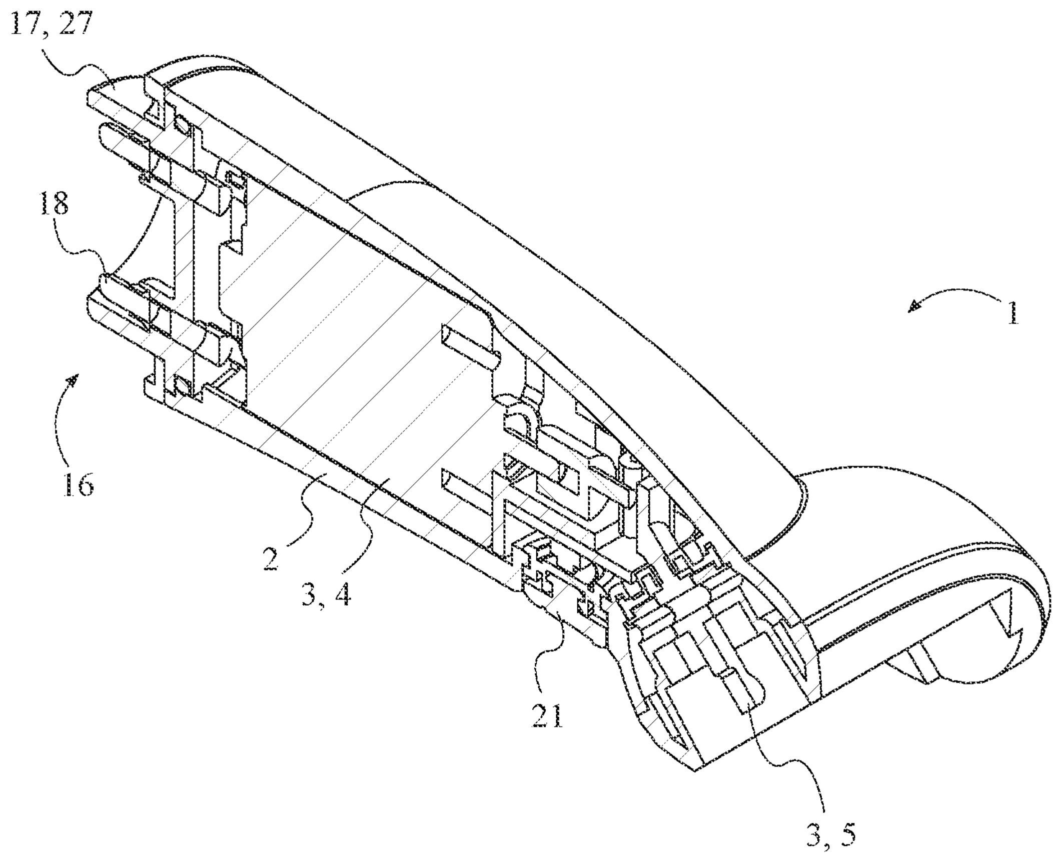
FIG. 13 is a perspective cross-sectional view of the modular shaver of the present invention taken along line 13-13 in FIG. 12.

Since the modular shaver 1 is an electric shaver, the present invention provides the user with features that enables the user to control the operation of the modular shaver 1. As can be seen in FIGS. 8 through 13 and 21, the present invention may further comprise a shaver power button 21. The shaver power button 21 enables the user to selectively turn the modular shaver 1 on or off. The shaver power button 21 is laterally integrated into the shaver hollow body 2 to position the shaver power button 21 in an accessible location where the shaver power button 21 can be easily reached using a finger. Further, the first interface piece 17 is electrically connected in series with the oscillating mechanism 3 through shaver power button 21. This way, when the user presses the shaver power button 21, the oscillating mechanism 3 is engaged and the user can groom the desired body hair with the at least one razor head 15.

Once the user is done, the user can press the shaver power button 21 again to turn the oscillating mechanism 3 off.

Figure 14:
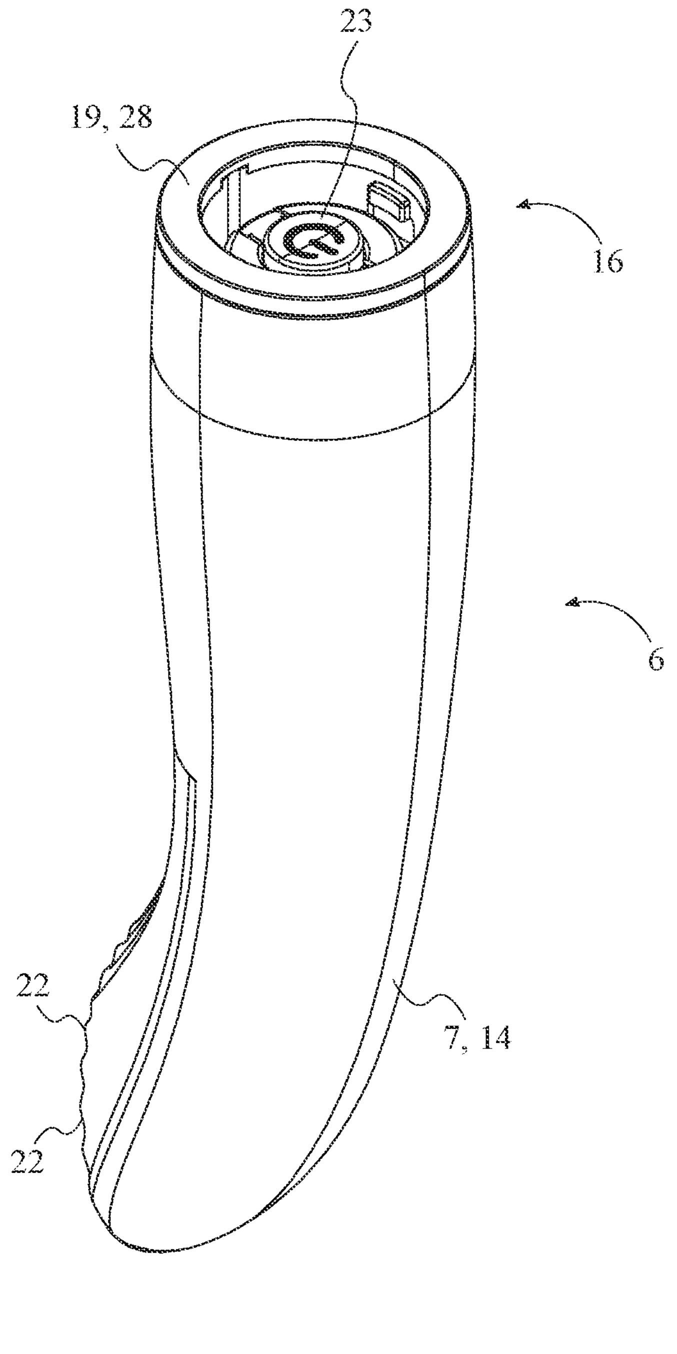
FIG. 14 is a top rear perspective view of a modular massager of the present invention.
Figure 15:
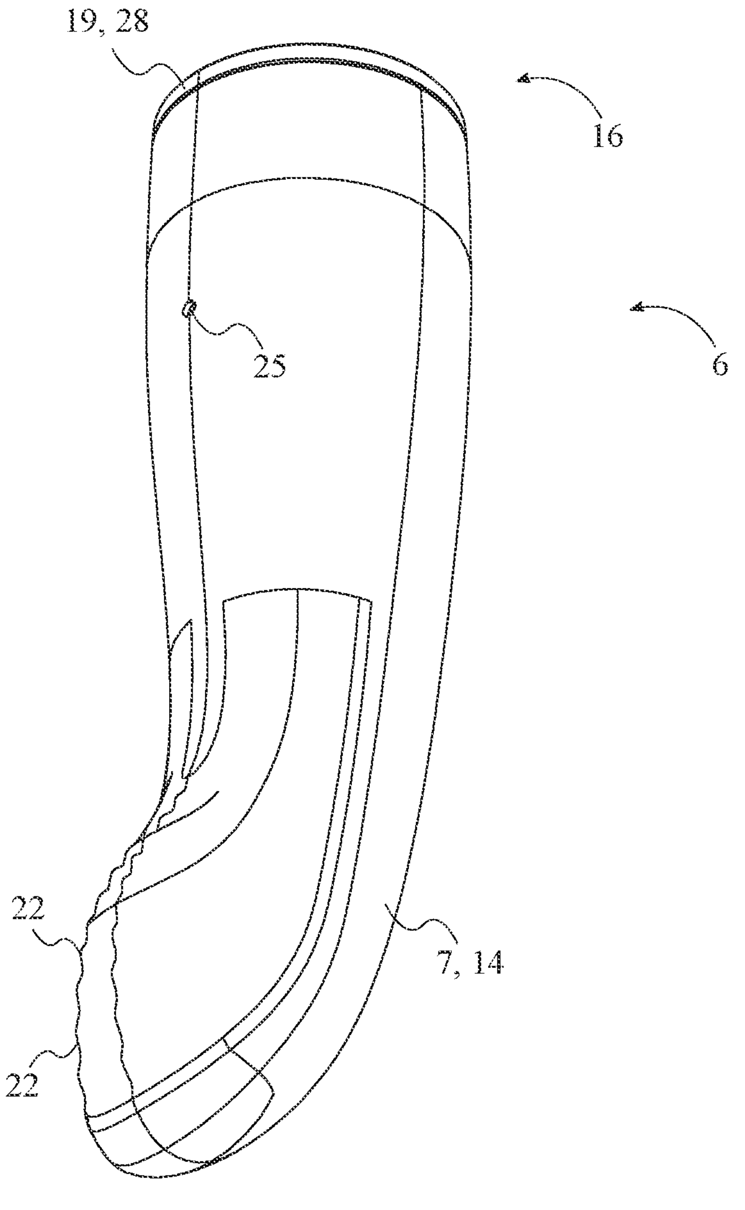
FIG. 15 is a bottom front perspective view of the modular massager of the present invention.
Figure 16:
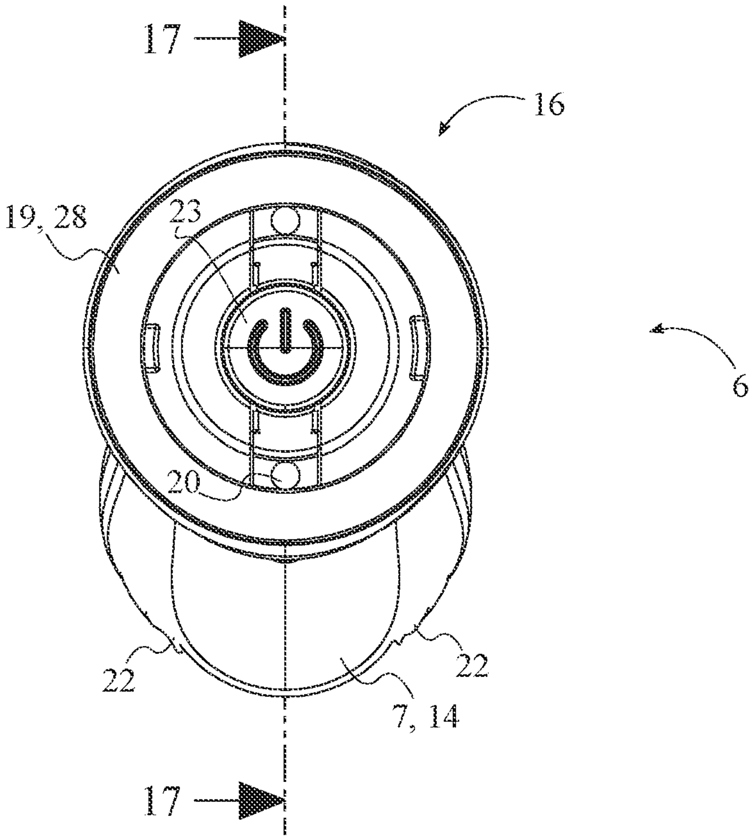
FIG. 16 is a top view of the modular massager of the present invention.
Figure 17:
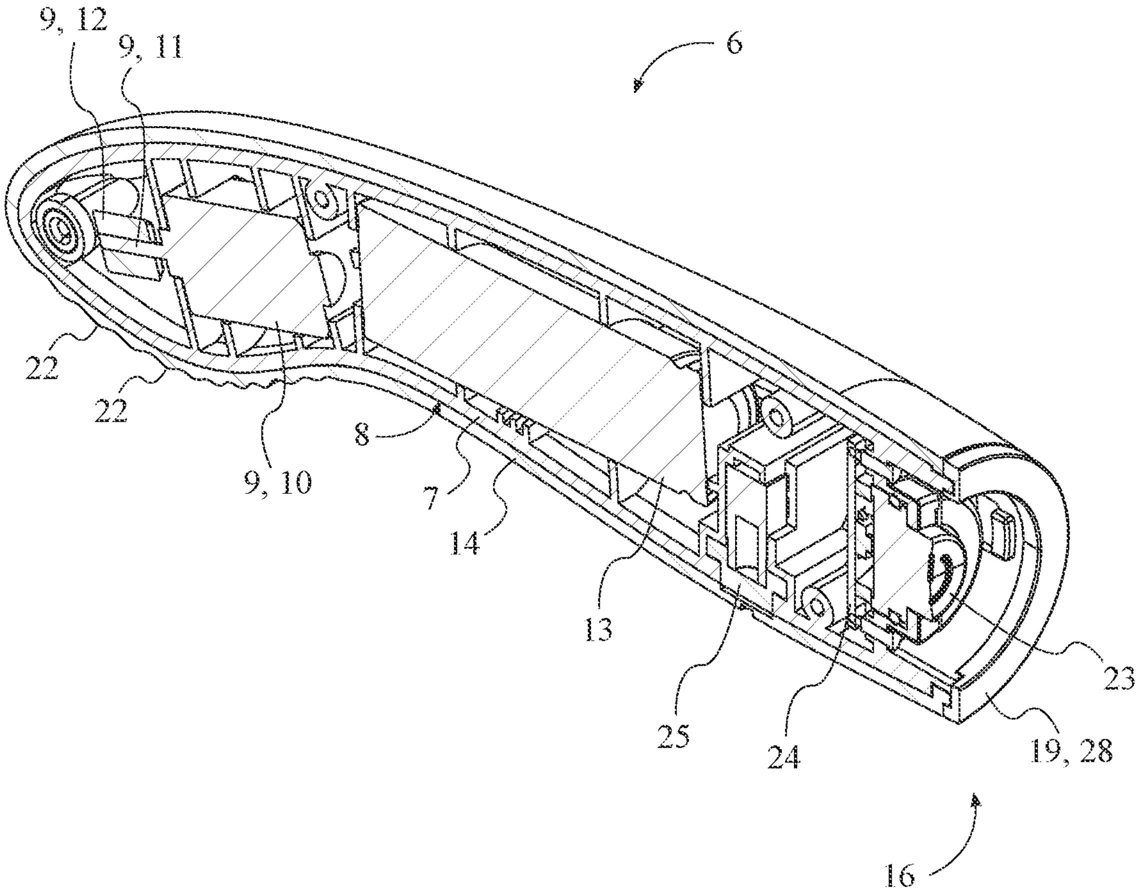
FIG. 17 is a perspective cross-sectional view of the modular massager of the present invention taken along line 17-17 in FIG. 16.

As previously discussed, the modular massager 6 is designed to provide physical stimulation to the target body area. As can be seen in FIGS. 14 through 17, to increase the efficiency of the physical stimulation, the present invention may further comprise a plurality of massaging protrusions 22. The plurality of massaging protrusions 22 increases the physical engagement of the modular massager 6 with the target body area. The plurality of massaging protrusions 22 can include several protrusions of different shapes and sizes arranged in a such a way that the physical stimulation generated is maximized. For example, the plurality of massaging protrusions 22 can include several thin elongated protrusions positioned parallel to each other. To accommodate the plurality of massaging protrusions 22, the massager hollow body 7 comprises an external body surface 8 corresponding to the outer surface of the massager hollow body 7. The plurality of massaging protrusions 22 is integrated into the external body surface 8 so that each of the plurality of massaging protrusions 22 is exposed to the target body area for physical stimulation. In addition, the plurality of massaging protrusions 22 is terminally positioned to the massager body, opposite to the second interface piece 19, so that the plurality of massaging protrusions 22 can be positioned against the target body area without obstruction from the second interface piece 19.

Furthermore, to provide a safe physical stimulation, the modular massager 6 may further comprise a tactilely-soft covering 14. As can be seen in FIGS. 14 through 17, the tactilely-soft covering 14 provides a soft surface that not only protects the massager hollow body 7 but also protects the body area the modular massager 6 is being used on. Accordingly, the massager hollow body 7 is sleeved by the tactilely-soft covering 14 so that all the surfaces of the modular massager 6 that may be in contact with the target body area are covered by the tactilely-soft covering 14. The tactilely-soft covering 14 also covers the plurality of massaging protrusions 22 so that the plurality of massaging protrusions 22 may not hurt the user when the plurality of massaging protrusions 22 is being used. In other embodiments, the tactilely-soft covering 14 may be made from other materials that are safe to use on the human body. Further, additional stimulating features may be provided on the modular massager 6 to further improve the physical stimulation generated using the modular massager 6.

As can be seen in FIGS. 14 through 17 and 21, similar to the shaver power button 21, the present invention may further comprise a massager power button 23 that enables the user to control the operation of the vibration mechanism 9. Unlike the shaver power button 21, the massager power button 23 is terminally integrated into the massager hollow body 7. This allows the massager power button 23 to be positioned away from the areas of the modular massager 6 that may be in contact with the target body area. This also prevents accidental engagement of the massager power button 23 that may cause the vibration mechanism 9 to be turned on or off when not desired. The massager power button 23 is also positioned amongst the second interface piece 19 to not block the coupling of the second interface piece 19 with the first interface piece 17. Further, the vibration mechanism 9 is electrically connected in series with the portable power source 13 through the massager power button 23. This way, the user can selectively turn on or off the vibration mechanism 9 by pressing the massager power button 23.

In some embodiments, the present invention can provide means to control the intensity of the vibrations generated by the vibration mechanism 9. As can be seen in FIGS. 14 through 17 and 21, the present invention may comprise a microcontroller 24. The microcontroller 24 enables the user to directly control the intensity of the vibration mechanism 9 while the user is utilizing the modular massager 6. This enables the user to adjust the level of physical stimulation experienced using the present invention. To do so, the microcontroller 24 is mounted within the massager hollow body 7 so that the microcontroller 24 is protected by the massager hollow body 7. In addition, the microcontroller 24 is electronically connected between the massager power button 23 and the vibration mechanism 9. This way, the user can control the intensity of the vibrations generated by the vibration mechanism 9 via the massager power button 23. For example, in one embodiment, the user may press the massager power button 23 a predetermined number of times to increase or decrease the vibration intensity. In other embodiments, the present invention may provide a separate button or user interface that enables the user to control the operation of the vibration mechanism 9 separately.

Furthermore, in some embodiments, the present invention may further provide means for maintaining the optimal operation of the different electrical and electronic components. As can be seen in FIGS. 14 through 17 and 21, the present invention may further comprise a reset button 25 that resets the vibration mechanism 9 and the oscillating mechanism 3 to factory settings. The reset button 25 is preferably a pinhole reset button 25 that can be engaged using a pin or similar thin device. Accordingly, the reset button 25 is laterally integrated into the massager hollow body 7 in such a way that the reset button 25 can only be accessed using a thin device. Further, the reset button 25 is electrically connected to the microcontroller 24 so that once the reset button 25 is pressed, the vibration mechanism 9 and the oscillating mechanism 3 are reset to factory settings. In other embodiments, additional maintenance features can be provided that help increase the operational lifetime of the present invention.

In the preferred embodiment, the portable power source 13 is a rechargeable mechanism that allows the present invention to be used continuously by recharging the portable power source 13. As can be seen in FIGS. 14 through 17 and 21, the present invention may further comprise a charging port 26 that enables the recharging of the portable power source 13. The charging port 26 can be designed to be used with the most efficient power cable currently available, such as Universal Serial Bus (USB) charging cables. The charging port 26 can then be electrically connected to an external power source, such as the building's electrical utilities, using the power cable to recharge the portable power source 13. Accordingly, the charging port 26 is hermetically integrated into the external body surface 8 to protect the internal electronic and electrical components. Further, the charging port 26 is laterally positioned to the massager hollow body 7 so that the charging port 26 does not hurt the user while using the modular massager 6. Furthermore, the charging port 26 is electrically connected to the portable power source 13 to transmit the power from the external power source to the portable power source 13. In other embodiments, the charging port 26 can be designed to accommodate other power transferring technologies, such as induction charging, or provide the portable power source 13 as a replaceable power source.

As previously discussed, the vibration mechanism 9 enables the controlled generation of vibrations for the physical stimulation of the user. As can be seen in FIGS. 14 through 17 and 21, the vibration mechanism 9 may comprise a stator 10, a rotor 11, and an eccentric weight 12. The stator 10 corresponds to the part of the vibration mechanism 9 that is fixed to the massager hollow body 7, while the rotor 11 corresponds to the part that rotates the eccentric weight 12. The eccentric weight 12 is designed to rotate in an asymmetric pattern against the massager hollow body 7 to generate vibrations. Accordingly, the stator 10 is mounted within the massager hollow body 7 to secure the stator 10 to the massager hollow body 7. The rotor 11 is also operatively coupled to the stator 10, wherein the stator 10 is used to drive a rotation of the rotor 11. For example, the rotor 11 and the stator 10 can be part of a vibration motor 4 that is installed within the massager hollow body 7. Further, the eccentric weight 12 is torsionally connected to the rotor 11 so that the eccentric weight 12 is rotated along with the rotor 11. In addition, the eccentric weight 12 is terminally positioned within the massager hollow body 7, opposite to the second interface piece 19. This way, the vibrations generated are most intensive close to the end of the modular massager 6 opposite to the second interface piece 19.

As previously discussed, the power interface 16 enables the mechanical coupling of the modular massager 6 to the modular shaver 1 as well as electrical connection between the oscillating mechanism 3 and the portable power source 13. As can be seen in FIGS. 1 through 17 and 21, the first interface piece 17 is preferably a male-shaped connector 27 while the second interface piece 19 is a female-shaped connector 28. This facilitates the coupling of the first interface piece 17 to the second interface piece 19. Further, the first interface piece 17 may comprise at least one first electrical contact 18, and the second interface piece 19 may comprise at least one second electrical contact 20. The at least one first electrical contact 18 and the at least one second electrical contact 20 are designed to enable the power transmission from the second interface piece 19 to the first interface piece 17 without requiring a direct connection between each other. Accordingly, the at least one first electrical contact 18 is connected along the male-shaped connector 27. The at least one first electrical contact 18 is also peripherally positioned to the male-shaped connector 27. This way, the male-shaped connector 27 can be connected to the female-shaped connector 28 without obstructing the at least one first electrical contact 18. Similarly, the at least one second electrical contact 20 is connected within the female-shaped connector 28. In addition, the at least one second electrical contact 20 is peripherally positioned to the female-shaped connector 28 so that the at least one second electrical contact 20 is free to electrically connect to the at least one first electrical contact 18. Then, once the male-shaped connector 27 is engaged with the female-shaped connector 28, the at least one first electrical contact 18 is pressed against the at least one second electrical contact 20. This enables the power transmission from the portable power source 13 to the oscillating mechanism 3.

The modular shaver 1 is designed to accommodate different razor heads with a similar attachment mechanism. To accommodate those razor heads, the oscillating mechanism 3 is designed to be compatible with the common attachment mechanism. As can be seen in FIGS. 8 through 13, the oscillating mechanism 3 may comprise a motor 4 and a reciprocating cam 5. The motor 4 can be a small electric motor 4 that fits within the shaver hollow body 2. The reciprocating cam 5 connects the motor 4 to the blades of the at least one razor head 15, as long as the at least one razor head 15 selected has the common attachment mechanism. Accordingly, the motor 4 is mounted within the shaver hollow body 2 to isolate the motor 4 from the exterior of the shaver hollow body 2. In addition, the motor 4 is operatively coupled to the at least one razor head 15 by the reciprocating cam 5, wherein the reciprocating cam 5 is used to convert rotational motion of the motor 4 into reciprocating linear motion of the at least one razor head 15. In other words, the reciprocating cam 5 connects the motor 4 to the blades of the at least one razor head 15 and converts the rotation from the motor 4 to a reciprocating motion that causes the blades of the at least one razor head 15 to reciprocate. In other embodiments, different mechanisms can be used for different head attachments.

Figure 18:
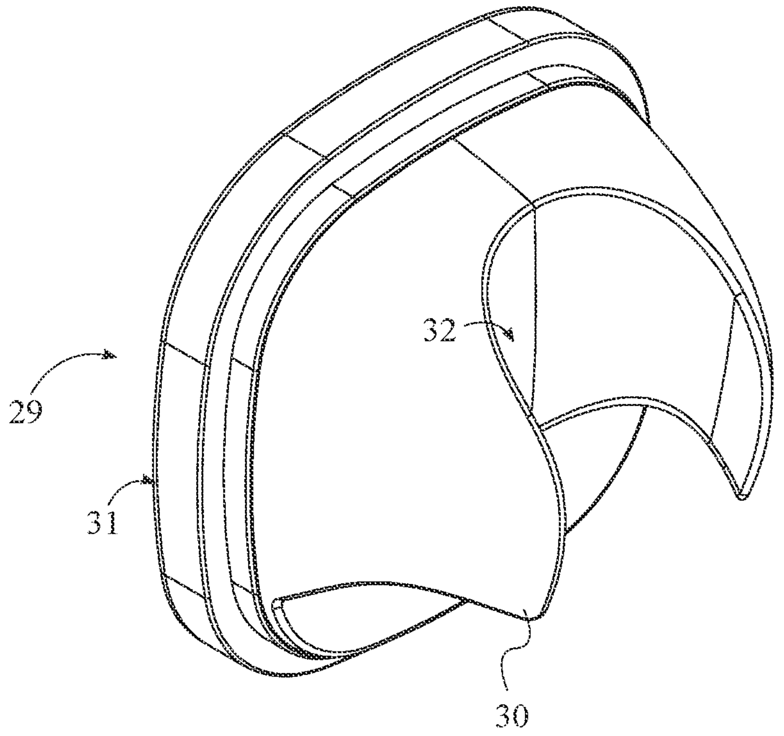
FIG. 18 is a top front perspective view of the device holder of the present invention.
Figure 19:
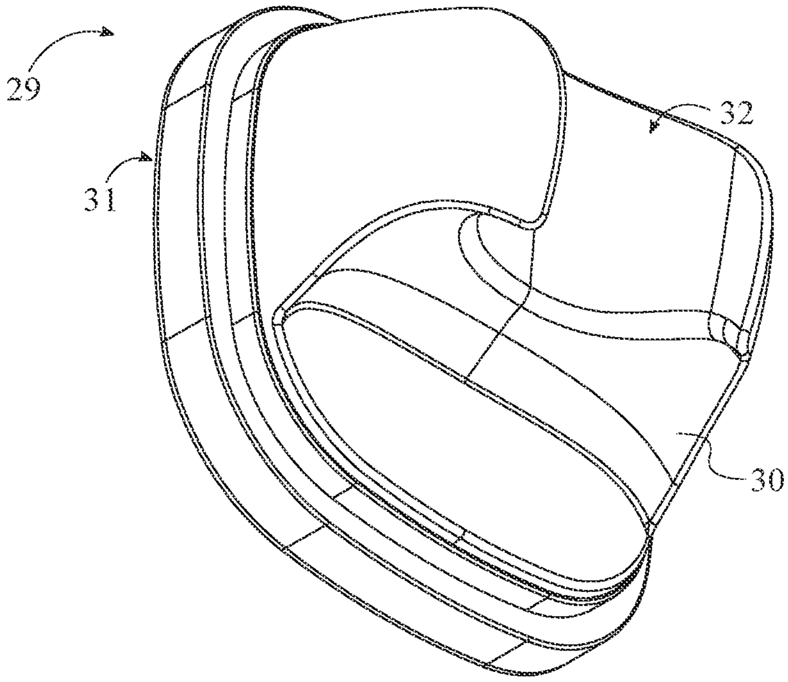
FIG. 19 is a bottom front perspective view of the device holder of the present invention.
Figure 20:
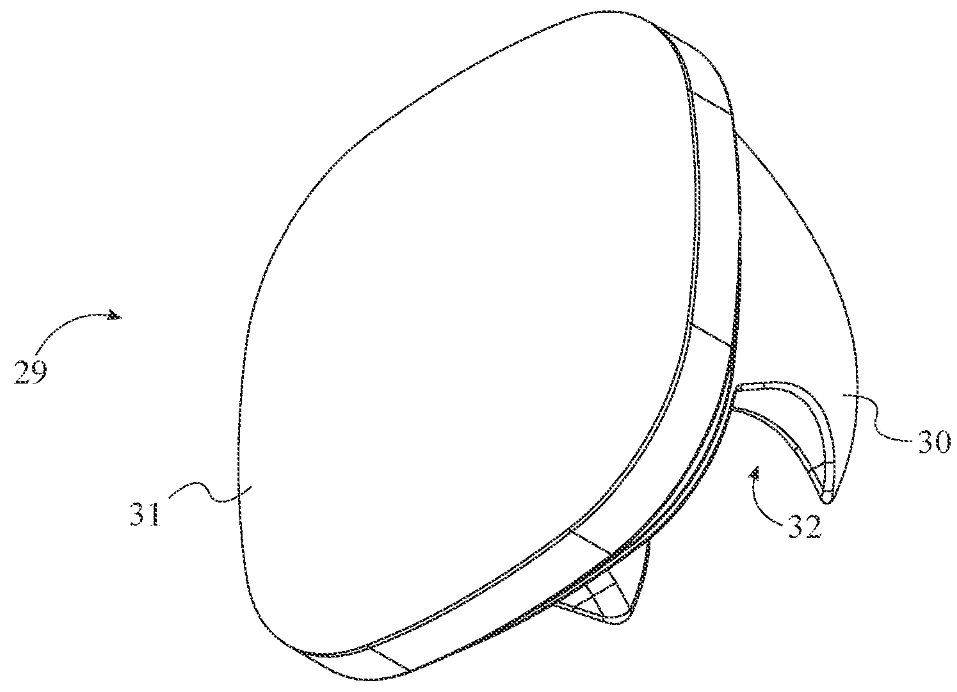
FIG. 20 is a bottom rear perspective view of the device holder of the present invention.

The present invention can include several accessories that improve the use of the present invention. For example, as can be seen in FIGS. 4, 5, and 18 through 20, the present invention may further comprise a device holder 29. The device holder 29 is designed to retain the present invention at one designated location when not in use. To do so, the device holder 29 may comprise a holder body 30, a surface-attachment feature 31, and a shaver-receiving cavity 32. The holder body 30 is designed to match the shape and size of the modular shaver 1. The surface-attachment feature 31 is an attachment mechanism that enables the attachment of the holder body 30 to a desired surface, such as a mirror, a wall, a flat surface, etc. The surface-attachment feature 31 can vary according to the desired surface and can include, but is not limited to, adhesive, hook-and-loop-fasteners, one or more suction caps, etc. The shaver-receiving cavity 32 corresponds to the space on the holder body 30 where the modular shaver 1 fits into. Accordingly, the surface-attachment feature 31 is connected adjacent to the holder body 30 to secure the surface-attachment feature 31 to the holder body 30. In addition, the shaver-receiving cavity 32 traverses into the holder body 30, opposite to the surface-attachment feature 31, to enable the attachment of the present invention to the device holder 29. Then, to mount the present invention to the device holder 29, the shaver hollow body 2 is inserted into the shaver-receiving cavity 32. The rest of the present invention is then supported by the device holder 29. In other embodiments, different accessories can be provided that increase the functionality of the present invention.

Although the invention has been explained in relation to its preferred embodiment, it is to be understood that many other possible modifications and variations can be made without departing from the spirit and scope of the invention.

What is claimed is:

1. An electric shaving massager comprising:
a modular shaver;
a modular massager;
at least one razor head;
a power interface;
the modular shaver comprising a shaver hollow body and an oscillating mechanism;
the modular massager comprising a massager hollow body, a vibration mechanism, and a portable power source;
the power interface comprising a first interface piece and a second interface piece;
the first interface piece being a male-shaped connector;
the second interface piece being a female-shaped connector;
the first interface piece comprising at least one first electrical contact;
the second interface piece comprising at least one second electrical contact;

the at least one razor head being terminally mounted to the shaver hollow body;

the first interface piece being terminally mounted to the shaver hollow body, opposite to the at least one razor head;

the oscillating mechanism being mounted within the shaver hollow body;

the oscillating mechanism being operatively coupled to the at least one razor head, wherein the oscillating mechanism is used to drive a reciprocating shaving motion of the at least one razor head;

the oscillating mechanism being electrically connected to the first interface piece;

the second interface piece being terminally mounted to the massager hollow body;

the portable power source being mounted within the massager hollow body, adjacent to the second interface piece;

the vibration mechanism being mounted within the massager hollow body, offset from the second interface piece;

the second interface piece and the vibration mechanism being electrically connected to the portable power source;

the first interface piece and the second interface piece being engaged to each other;

the first interface piece being electrically connected to the second interface piece;

the at least one first electrical contact being connected along the male-shaped connector;

the at least one first electrical contact being peripherally positioned to the male-shaped connector;

the at least one second electrical contact being connected within the female-shaped connector;

the at least one second electrical contact being peripherally positioned to the female-shaped connector; and the at least one first electrical contact being pressed against the at least one second electrical contact.

2. The electric shaving massager as claimed in claim 1 further comprising:

a shaver power button;

the shaver power button being laterally integrated into the shaver hollow body; and the first interface piece being electrically connected in series with the oscillating mechanism through the shaver power button.

3. The electric shaving massager as claimed in claim 1 further comprising:

a plurality of massaging protrusions;

the massager hollow body comprising an external body surface;

the plurality of massaging protrusions being integrated into the external body surface; and the plurality of massaging protrusions being terminally positioned to the massager hollow body, opposite to the second interface piece.

4. The electric shaving massager as claimed in claim 1 further comprising:

the modular massager further comprising a tactilely-soft covering; and the massager hollow body being sleeved by the tactilely-soft covering.

5. The electric shaving massager as claimed in claim 1 further comprising:

a massager power button;

the massager power button being terminally integrated into the massager hollow body;

the massager power button being positioned within the second interface piece; and the vibration mechanism being electrically connected in series with the portable power source through the massager power button.

6. The electric shaving massager as claimed in claim 5 further comprising:

a microcontroller;

the microcontroller being mounted within the massager hollow body; and the microcontroller being electronically connected between the massager power button and the vibration mechanism.

7. The electric shaving massager as claimed in claim 6 further comprising:

a reset button;

the reset button being laterally integrated into the massager hollow body; and the reset button being electrically connected to the microcontroller.

8. The electric shaving massager as claimed in claim 1 further comprising:

a charging port;

the massager hollow body comprising an external body surface;

the charging port being hermetically integrated into the external body surface;

the charging port being laterally positioned to the massager hollow body; and the charging port being electrically connected to the portable power source.

9. The electric shaving massager as claimed in claim 1 further comprising:

the vibration mechanism comprising a stator, a rotor, and an eccentric weight;

the stator being mounted within the massager hollow body;

the rotor being operatively coupled to the stator, wherein the stator is used to drive a rotation of the rotor;

the eccentric weight being torsionally connected to the rotor; and the eccentric weight being terminally positioned within the massager hollow body, opposite to the second interface piece.

10. The electric shaving massager as claimed in claim 1 further comprising:

the oscillating mechanism comprising a motor and a reciprocating cam;

the motor being mounted within the shaver hollow body; and the motor being operatively coupled to the at least one razor head by the reciprocating cam, wherein the reciprocating cam is used to convert rotational motion of the motor into reciprocating linear motion of the at least one razor head.

11. The electric shaving massager as claimed in claim 1 further comprising:

a device holder;

the device holder comprising a holder body, a surface-attachment feature, and a shaver-receiving cavity;

the surface-attachment feature being connected adjacent to the holder body; and the shaver-receiving cavity traversing into the holder body, opposite to the surface-attachment feature.

* * * * *